(12) United States Patent
Mitric et al.

(10) Patent No.: US 7,548,119 B2
(45) Date of Patent: Jun. 16, 2009

(54) DIGITALLY CONTROLLED OSCILLATOR WITH JITTER SHAPING CAPABILITY

(75) Inventors: Krste Mitric, Ottawa (CA); Slobodan Milijevic, Nepean (CA)

(73) Assignee: Zarlink Semiconductor Inc., Kanata, ON (CA)

( * ) Notice: Subject to any disclaimer, the term of this patent is extended or adjusted under 35 U.S.C. 154(b) by 83 days.

(21) Appl. No.: 11/740,199

(22) Filed: Apr. 25, 2007

(65) Prior Publication Data

US 2007/0262822 A1 Nov. 15, 2007

(30) Foreign Application Priority Data

Apr. 26, 2006 (GB) ................... 0608202.8

(51) Int. Cl.
*H03L 7/085* (2006.01)
*H03L 7/089* (2006.01)
*H03L 7/099* (2006.01)
(52) U.S. Cl. ...................... 331/1 A; 327/105
(58) Field of Classification Search ................. 331/1 A, 331/4, 57; 327/105; 375/376; 708/101
See application file for complete search history.

(56) References Cited

U.S. PATENT DOCUMENTS

| 4,410,954 | A | * | 10/1983 | Wheatley, III | ............... | 708/101 |
| 5,373,255 | A | * | 12/1994 | Bray et al. | ................... | 331/1 A |
| 5,381,116 | A | * | 1/1995 | Nuckolls et al. | ............ | 331/1 A |
| 6,044,124 | A | * | 3/2000 | Monahan et al. | ............ | 375/376 |
| 6,252,464 | B1 | * | 6/2001 | Richards et al. | ................. | 331/4 |
| 6,396,313 | B1 | * | 5/2002 | Sheen | ......................... | 327/105 |
| 6,903,615 | B2 | * | 6/2005 | Landman et al. | ............... | 331/57 |
| 7,282,999 | B2 | * | 10/2007 | Da Dalt et al. | ............... | 331/1 A |

FOREIGN PATENT DOCUMENTS

WO WO 95/31860 A1 11/1995

* cited by examiner

*Primary Examiner*—James H. Cho
*Assistant Examiner*—Crystal L Hammond
(74) *Attorney, Agent, or Firm*—Marks & Clerk; Richard J. Mitchell

(57) ABSTRACT

A digitally controlled oscillator (DCO) generating an output clock includes a jitter shaping module for shifting low frequency digital jitter on the output clock into higher frequency jitter.

11 Claims, 1 Drawing Sheet rem_acc(n) = rem_acc(n-1) + remainder(n-1)                                if js_overflow = 0
rem_acc(n) = rem_acc(n-1) + remainder(n-1) - frequency(n-1)    if js_overflow = 1
js_overflow = MSB of rem_acc(n-1)

DIGITALLY CONTROLLED OSCILLATOR WITH JITTER SHAPING CAPABILITY

FIELD OF THE INVENTION

This invention relates to the field of signal processing, and in particular to a digitally controlled oscillator (DCO) for generating clock signals.

BACKGROUND OF THE INVENTION

In processing mixed analog and digital signals, one of the most important factors for good performance of an analog circuit, as part of a mixed signal circuit, is the amount of jitter in bandwidth of interest of the analog circuit. Jitter manifests itself as unwanted variation in the interval between clock pulses. This factor is extremely important in situations where the analog part of the circuitry uses a digital clock for its sampling or over-sampling clock (e.g. analog-to-digital converters (ADCs) and digital-to-analog converters (DACs).

In the digital era, where the trend is to use as many digital circuits as possible, digital clock synthesizers (i.e. DCOs) are used more and more to create sampling clocks for different analog circuits. DCO generated clocks have uniformly distributed jitter ranging from DC up to half of the clock carrier frequency. Since this bandwidth always includes the range of interest of most mixed signal circuits, there is a need for a circuit that can shift digital jitter into high frequency area, outside the range of interest, where the performance of the circuits is not affected.

In previous implementations, e.g. ADC and DAC converters, a clean clock from a crystal oscillator was used as a sampling clock. When a network clock, or clock from a digital source, such as DCO, had to be used as sampling clock, the DCO output clock was first filtered with an analog phase locked loop (APLL) before being used.

U.S. Pat. No. 6,396,313 describes a jitter shaping circuit. This jitter shaper has a low efficiency since changes in jitter due to jitter shaping are not considered when making decisions about further jitter shaping.

SUMMARY OF THE INVENTION

The invention provides a digitally controlled oscillator (DCO) with the capability of shifting low frequency digital jitter, on its output clock, into higher frequency jitter. Embodiments of the invention permit the reduction of the sampling clock jitter, within the bandwidth of interest for a mixed signal circuit, with fully digital circuit, which is smaller in size and consumes less power than an equivalent circuit with DCO followed by an APLL. In addition to size and power advantages, embodiments of this invention give better results of jitter suppression at the bandwidth of interest due to the fact that APLLs have jitter gain in low frequency area. The invention allows mixed signal circuits to perform better in removing other type of noise that needs to be removed from signals that are being processed.

Accordingly therefore the invention provides a digitally controlled oscillator (DCO) for generating an output clock, comprising an overflow counter for generating an output signal determined by a clock frequency signal; a frequency control adder responsive to a frequency control input value to determine the frequency of said output clock; a DCO accumulator for accumulating the output of said frequency control adder and generating an enable signal for said overflow counter, said DCO accumulator also outputting a remainder value with said enable signal; and a jitter shaping circuit for shifting low frequency digital jitter on the output clock into higher frequency jitter, said jitter shaping circuit comprising: a jitter shaping accumulator for accumulating an error in edge placement; a clock advancement circuit for advancing the output signal from the overflow counter whenever there is an overflow of the jitter shaping accumulator; and an error resolution circuit with a feedback signal from said jitter shaping accumulator that sets the input to said jitter shaping accumulator as the remainder value or the difference between said remainder value and said frequency value when an adjustment in edge placement of said output signal occurs.

The invention can be used in mixed signal circuits to generate clocks that are necessary for analog part of the circuit, as well as in digital circuits to generate clock that can be used by external analog or mixed signal devices.

Functionality of the DCO can be simplified by presenting it as an accumulator that can have fixed numerical value on its input, run by a high frequency master clock. Depending on the input value, the accumulator will overflow after certain number of master clock cycles. The overflow bit can be used as gating signal for the master clock in order to generate the output clock (logical AND function), which will on average have desired clock frequency.

The input value to the accumulator is proportional to the desired clock frequency. The phase difference between the output clock and the ideal clock is proportional to the accumulator value at the time of overflow, named remainder. When the remainder value is zero at the time of the overflow the output clock edge is phase aligned with the ideal clock edge. The maximum value of the remainder represents the biggest phase error in the output clock edge position. Each different value in the accumulator, at the point of the overflow, also represents amplitude of the output clock jitter. Since the accumulator can have any possible value at the overflow, the output clock jitter amplitude will have any value between zero and one master clock period. When the output clock frequency does not have common denominator with the master clock frequency, all jitter components will be randomly distributed with equal probability; therefore the output clock jitter will have uniform distribution.

The invention is based on the use of the DCO accumulator remainder to change the output clock position, such that additional clock edge repositioning will be performed for low frequency changes, therefore shifting low frequency jitter into high frequency jitter.

The DCO accumulator remainder value, representing error in the output clock edge placement, is additionally accumulated. Overflow value of the additional remainder accumulator is used to determine whether the edge repositioning is necessary or not. The overflow signal is also used as the feedback signal to the remainder accumulator, by changing the remainder accumulator input value when the overflow happens.

The invention is more efficient than the shaper described in U.S. Pat. No. 6,396,313 because the maximum peak-to-peak jitter two master clock cycles, regardless of jitter shaping order. The jitter shaper produces maximally master clock cycle peak-to-peak of high frequency jitter on top of one master clock generally uniformly distributed frequency coming from the DCO. In the case of the prior art jitter shaper, peak-to-peak jitter increases with order at the rate of two master clock cycles per order. The jitter shaper of the present invention will just increase the high frequency components when the order is increased. It will never advance thh output clock by more than one master clock cycle.

BRIEF DESCRIPTION OF THE DRAWINGS

The invention will now be described in more detail, by way of example only, with references to the following drawings, in which.

DETAILED DESCRIPTION OF THE PREFERRED EMBODIMENT

The noise reduction circuit comprises three main blocks, namely a digital controlled oscillator (DCO), a noise activity detector, and a spectral gain estimator.

DCO Overview

Figure 1:
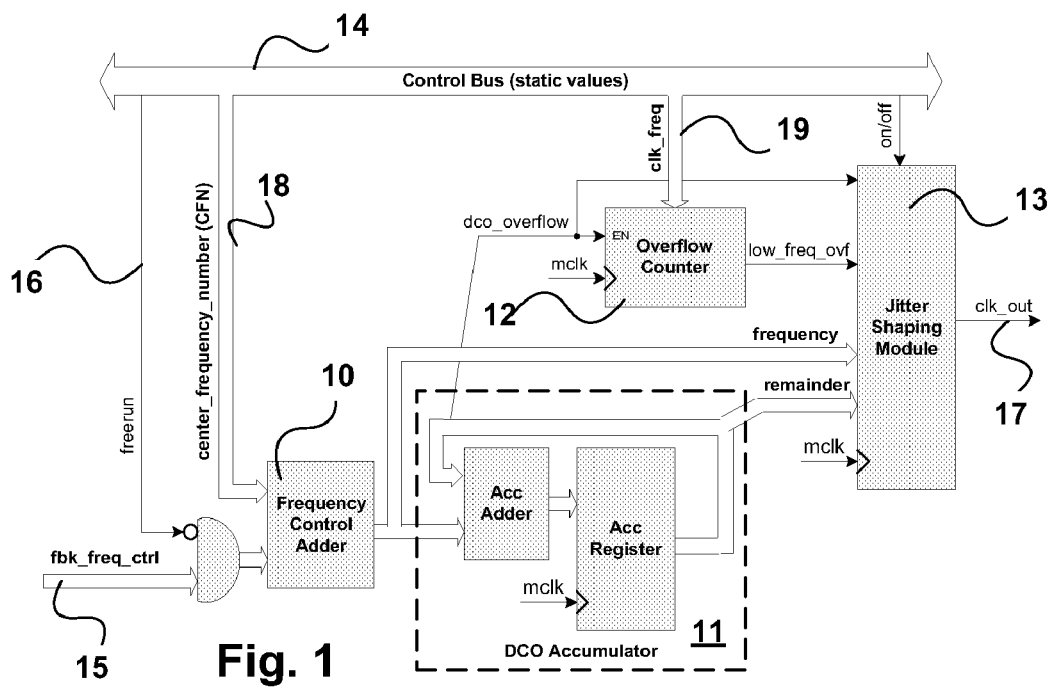
FIG. 1 is a top-level block diagram of the DCO circuit according to the preferred embodiment.

As shown in FIG. 1, the DCO in accordance with an embodiment of the invention consists of a Frequency Control Adder 10, the DCO Accumulator 11, the Overflow Counter 12 and the Jitter Shaping Module 13 of first or higher orders. All static control signals for the DCO come through the Control Bus 14, from external registers (not shown). In addition to the static control signals, there is an additional control bus 15 for the DCO center frequency control—feedback frequency control bus ('fbk_freq_ctrl'). By using the feedback frequency control bus 15, the DCO can be part of a digital phase locked loop (DPLL) that locks its output clock to an input reference clock. The feedback frequency control usually comes from a phase detector. Its value (2's complement binary number) is proportional to a phase difference between the DCO output clock and the input reference clock, such that the DCO center frequency is adjusted toward reducing the phase difference.

The static control signals are:

Freerun control signal 16 ('freerun'), which determines whether the DCO output clock ('clk_out') 17 will be locked to an input reference signal (represented by 'fbk_freq_ctrl' control bus 15), or whether it will be free-running (based on local frequency oscillator).

Center frequency number (CFN) 18, which is a 2's complement binary number that represents the desired DCO center frequency, which is binary divided inside the Overflow Counter to get required output clock frequency.

Output clock frequency control ('clk_freq') 19, which is a control word that selects the desired output clock frequency.

Jitter shaping enable signal ('on/off'), which is used to turn the jitter shaping on or off.

The DCO center frequency, the highest DCO frequency that can be binary divided to a desired output clock frequency, can be chosen, based on the master clock frequency ('mclk'), by programming appropriate CFN value into one of the control registers, using the following equation:

$$f_{DCO} = \frac{CFN + \text{fbk\_freq\_ctrl}}{2^{DCO\_ACC\_WIDTH}} * f_{mclk}$$

where, $f_{DCO}$ represents the DCO center frequency, DCO_ACC_WIDTH represents width of the DCO Accumulator, and $f_{mclk}$ represents the master clock frequency.

In the DCO freerunning mode, when the 'fbk_freq_ctrl' value is zeroed, the DCO center frequency is proportional to the master clock frequency.

The feedback frequency control word ('fbk_freq_ctrl') is being added to the DCO Center Frequency Number ('dco_cfn') inside the Frequency Control Adder. The resulting bus 'frequency' is used as one of the Jitter Shaping Module inputs. The output of the adder ('frequency') is accumulated in the DCO Accumulator, consisting of the second adder and the register running on the master clock frequency ('mclk'). The carry bit ('dco_overflow') of the accumulator is used as enable signal for the Overflow Counter 12, which counts how many times the DCO has overflowed. The counter wraps around when it reaches the maximum ($2^{DCO\_ACC\_WIDTH}-1$). The overflow signal ('dco_overflow') and the remainder ('remainder') of the DCO Accumulator are also used as Jitter Shaping Module inputs. The 'remainder' consists of all bits of the Accumulator, excluding the most significant bit ('dco_overflow').

The Overflow Counter output ('low_freq_ovf'), coming directly from one of the counter bits, represents an output clock with desired frequency, which is chosen by the output clock frequency control bus ('clk_freq'). The 'low_freq_ovf' is also used as the Jitter Shaping Module input. The Overflow Counter is a basic binary counter, running on the master clock frequency ('mclk'), with counting enable signal ('dco_overflow').

To perform jitter shaping on the Overflow Counter output ('low_freq_ovf'), the Jitter Shaping module is used.

Jitter Shaping

For a given clock frequency and accumulator width, the DCO output clock frequency can only have discrete values. Therefore, the desired output clock frequency has limited accuracy. The remaining value in the DCO Accumulator at a carry ('remainder') represents the exact phase error of the carry pulse ('dco_overflow') with respect to an ideal signal.

The error is maximally $1/f_{mclk}$ [sec] and it represents the intrinsic jitter of the DCO. Increasing the master clock frequency ('$f_{mclk}$') reduces the intrinsic jitter. The 'remainder' can be used to correct the phase of the carry pulse, thereby allowing output jitter to be shaped. The remaining quantization error (jitter) can be removed over time by taking the rounding-error into account at the next rounding.

Figure 2:
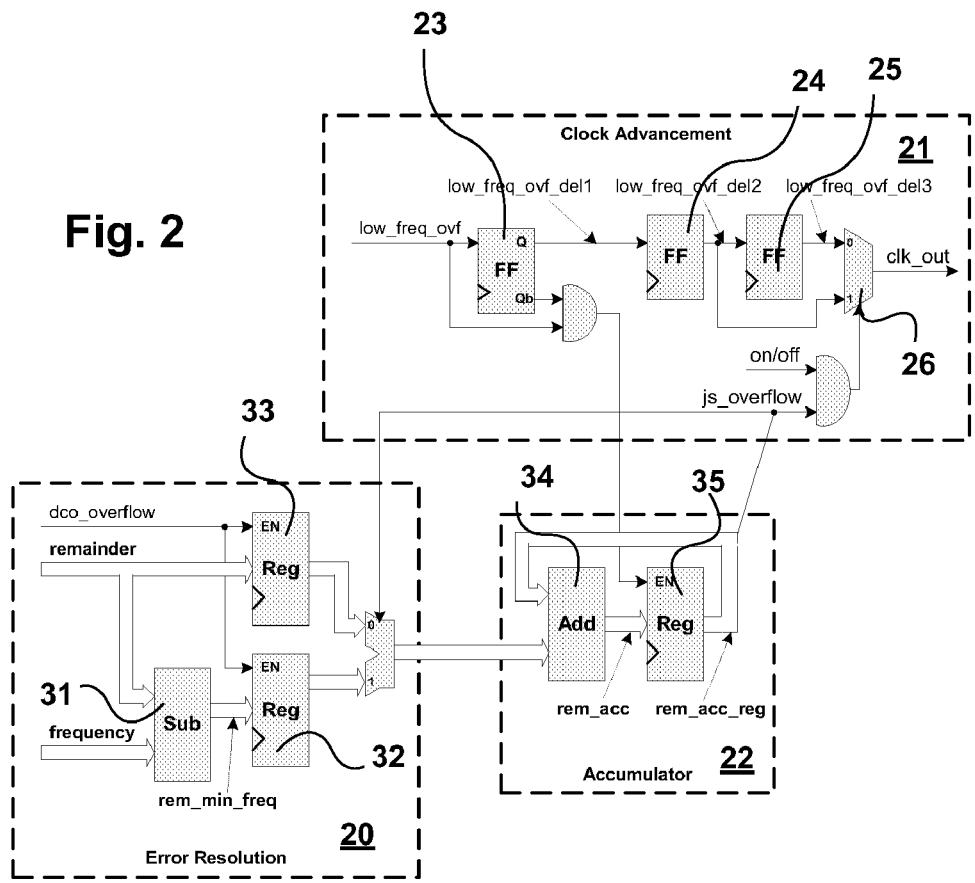
FIG. 2 is the block diagram of the Jitter Shaping module from FIG. 1.

The Jitter Shaping circuit, shown in FIG. 2, is used for clock generation. In the embodiment shown in FIG. 2, the Jitter Shaping module 13 consists of the Error Resolution circuit 20 containing subtractor 31 and registers 32, 33, the Clock Advancement circuit 21 containing flip flops 23, 24, 25 and the Jitter Shaping Accumulator 22 containing adder 34 and register 35.

The error in the edge placement is accumulated in the Jitter Shaping module 13. Input to the Jitter Shaping Accumulator 22 is the error in the edge placement. As determined by the Error Resolution circuit, the error is represented by either the DCO 'remainder' or difference between the DCO 'remainder' and the DCO 'frequency'.

Jitter shaping is carried out by advancing the output signal from the DCO Overflow counter whenever there is an overflow of the Jitter Shaping Accumulator 22. The DCO Overflow Counter output signal 'low_freq_ovf' is actually a bit in the counter that has the desired output clock frequency.

Having in mind that advancement is not possible in a circuit without a feedback loop, the Overflow counter signal ('low_freq_ovf') is additionally delayed for two master clock cycles by flip flops 23, 24. The most delayed signal ('low_freq_ovf_del3') is used when no advancement is necessary, and the signal that is delayed for one master clock cycle less ('low_freq_ovf_del2') is used when advancement needs to happen. This is achieved by passing the third flip flop 25 with the aid of multiplexer 26

The jitter shaping process can be interpreted such that an advancement operation is required whenever the total (accumulated) difference between the output clock edge, when jitter shaping is not used, and an ideal edge position of that particular frequency clock reaches one master clock cycle.

The same Jitter Shaping Accumulator 'js_overflow' signal is used to select the error that is accumulated. Basically, when there is no adjustment (the Jitter Shaping Accumulator 'js_overflow' signal is low) the error representing the difference between the output clock edge and the ideal clock edge is equal to the DCO 'remainder'. The DCO 'remainder' is the DCO phase value at the time of the DCO overflow.

When the adjustment happens, the edge placement error is equal to the difference between the DCO 'remainder' value and the DCO 'frequency' value. The DCO 'frequency' is the value that is accumulated inside the DCO on every master clock cycle, so it represents one master clock cycle, while the DCO 'remainder' is a fraction of the master clock cycle, and is always less than or equal to the DCO 'frequency'. Therefore, when the adjustment happens, the error is always negative number or zero.

Since the error is equal to the 'remainder' when there is no advancement, and the 'frequency' represents one master clock cycle, the error during advancement (when the Jitter Shaping Accumulator 'js_overflow' signal is high) must be represented as the difference between the two, because the advancement size is one master clock cycle. The Jitter Shaping Accumulator 'js_overflow' signal can also be seen as the feedback signal of the resulting advancement to the jitter shaping process, represented by the accumulator.

When jitter shaping is turned off, the Jitter Shaping circuit simply delays the DCO Overflow Counter signal for a couple of clock cycles. This delay comes as result of already mentioned delaying of the DCO Overflow Counter signal in order to make advancing possible.

The jittershaper according to the invention is more efficient since it is self contained using feedback information in the way that different value of phase error is being accumulated in the jittershaping accumulator depending on status of overflow of the accumulator (error is being either the DCO remainder or the DCO remainder minus DCO frequency). The DCO frequency value represents one master clock cycle phase in the output clock, while the DCO remainder represents fraction of the master clock period in the output clock phase, based on the ideal clock with the same frequency.

When jittershaping happens (output clock edge advancement), the accumulation error is being changed to compensate for that one master clock in order to keep output frequency with no additional jitter being added. Every unnecessary additional jitter degrades output clock.

The DCO in accordance with the invention can be part of a DPLL. This allows the DCO to suppress also components of jitter coming from the reference line to the DPLL.

The invention claimed is:

1. A digitally controlled oscillator (DCO) for generating an output clock, comprising
   a frequency control unit for generating a frequency control word;
   a DCO accumulator for accumulating said frequency control word during each cycle of a master clock and generating an enable signal each time said DCO accumulator overflows, said DCO accumulator also outputting a remainder value with said enable signal;
   an overflow counter for counting each occurrence of said enable signal and responsive to a clock frequency signal to generate an output signal at a frequency determined by said clock frequency signal;
   a jitter shaping circuit responsive to said frequency control word, said remainder value, and said output signal of said overflow counter, for shifting low frequency digital jitter in said output signal into higher frequency jitter, said jitter shaping circuit comprising:
   an error resolution circuit responsive to said remainder value and said frequency control word to generate an error value representing a timing error in said output signal;
   an error accumulator for accumulating said error value; and
   a clock advancement circuit for advancing the output signal from the overflow counter by a one master clock cycle when the accumulated error value reaches one master clock cycle; and
   wherein said error resolution circuit sets said error value to the difference between said remainder value and said frequency control word during advancement of said output signal and otherwise sets said error value to said remainder value.

2. A digitally controlled oscillator as claimed in claim 1, wherein said error resolution circuit includes a multiplexer having a select input connected to an overflow output of said jitter shaping accumulator to select said remainder value or said difference depending on the overflow status of said jitter shaping accumulator.

3. A digitally controlled oscillator as claimed in claim 2, wherein said error resolution circuit comprises a pair of registers respectively receiving at their inputs said remainder value and said difference between said remainder value and said frequency control word, and each register receiving at a second input said enable signal, and wherein said multiplexer selects one of said pair of registers in response to an overflow signal from said jitter shaping accumulator.

4. A digitally controlled oscillator as claimed in claim 3, wherein said error resolution circuit comprises a subtractor connected to the input of one of said pair of registers.

5. A digitally controlled oscillator as claimed in claim 2, wherein said clock advancement circuit comprises delay elements for selectively delaying said clock frequency signal.

6. A digitally controlled oscillator as claimed in claim 5, wherein said delay elements are arranged to delay said output signal by a plurality of clock cycles, and
   a multiplexer is provided to bypass at least one of said delay elements when advancement of the output clock signal occurs.

7. A digitally controlled oscillator as claimed in claim 5, wherein said multiplexer has a select input receiving an overflow output signal from said jitter shaping accumulator.

8. A digitally controlled oscillator as claimed in claim 1, wherein said DCO accumulator comprises an adder and a register.

9. A method of generating an output clock with a digitally controlled oscillator (DCO), comprising
   generating an output signal determined by a clock frequency signal from an overflow counter;
   generating a frequency control word;
   accumulating said frequency control word in a DCO accumulator during each cycle of a master clock and generating, on a carry condition in said DCO accumulator, an enable signal and a remainder value;
   counting each occurrence of said enable signal in an overflow counter generating an output signal a frequency determined by a clock frequency signal;

accumulating in a jitter shaping accumulator an error value representing timing errors in said output signal; and advancing the output signal from the overflow counter by one master clock cycle when the accumulated error value reaches one master clock cycle; and wherein the error value that is input to said jitter shaping accumulator is the difference between the remainder value and the frequency control word when the output signal is advanced and otherwise is equal to said remainder value.

10. A method as claimed in claim 9, wherein the remainder value and difference between the remainder value and frequency control word are fed to the jitter shaping accumulator by a multiplexer having a select input receiving an overflow signal from the jitter shaping accumulator.

11. A method as claimed in claim 10, wherein the output signal is advanced by passing the output signal through delay elements that delay said output signal by a plurality of clock cycles, and by bypassing at least one of said delay elements when advancement of the output clock signal occurs.

* * * * *